United States Patent
Sharma et al.

(10) Patent No.: US 6,175,837 B1
(45) Date of Patent: Jan. 16, 2001

(54) OBJECT-RELATIONAL MAPPING TOLL THAT PROCESSES VIEWS

(75) Inventors: Rahul Sharma, Santa Clara; Linda G. DeMichiel, Los Altos, both of CA (US)

(73) Assignees: Sun Microsystems, Inc., Palo Alto, CA (US); Baan Development, B.V., Barneveld (NL)

(*) Notice: Under 35 U.S.C. 154(b), the term of this patent shall be extended for 0 days.

(21) Appl. No.: 09/106,186

(22) Filed: Jun. 29, 1998

Related U.S. Application Data (60) Provisional application No. 60/068,415, filed on Dec. 22, 1997.

(51) Int. Cl.[7] ............................................. G06F 17/30
(52) U.S. Cl. ........................................ 707/103; 707/102
(58) Field of Search ................................... 707/103, 102

(56) References Cited

U.S. PATENT DOCUMENTS

| | | | |
|---|---|---|---|
| 4,589,092 | 5/1986 | Matick | 711/207 |
| 5,043,876 | 8/1991 | Terry | 707/201 |
| 5,261,069 | 11/1993 | Wilkinson et al. | 711/145 |
| 5,263,155 | 11/1993 | Wang | 707/8 |
| 5,280,612 | 1/1994 | Lorie et al. | 707/8 |
| 5,291,583 | 3/1994 | Bapat | 717/5 |
| 5,301,297 | 4/1994 | Menon et al. | 711/114 |
| 5,499,371 * | 3/1996 | Henninger et al. | 717/2 |
| 5,504,885 | 4/1996 | Alashqur | 717/5 |
| 5,542,078 | 7/1996 | Martel et al. | 707/101 |
| 5,574,882 | 11/1996 | Menon et al. | 711/114 |
| 5,596,746 | 1/1997 | Shen et al. | 707/101 |
| 5,659,738 * | 8/1997 | Letkeman et al. | 707/102 |
| 5,701,453 * | 12/1997 | Maloney et al. | 707/2 |
| 5,732,257 | 3/1998 | Atkinson et al. | 707/4 |
| 5,742,813 | 4/1998 | Kavanagh et al. | 707/8 |
| 5,765,159 | 6/1998 | Srinivasan | 707/102 |
| 5,774,731 | 6/1998 | Higuchi et al. | 710/200 |
| 5,829,006 | 10/1998 | Parvathaneny et al. | 707/101 |
| 5,835,910 | 11/1998 | Kavanagh et al. | 707/103 |
| 5,850,544 | 12/1998 | Parvathaneny et al. | 707/101 |
| 5,857,197 | 1/1999 | Mullins | 707/103 |
| 5,878,411 * | 5/1999 | Burroughs et al. | 707/4 |
| 5,878,419 | 3/1999 | Carter | 707/10 |
| 5,893,108 | 4/1999 | Scrinivasan et al. | 707/103 |
| 5,907,846 | 5/1999 | Berner et al. | 707/103 |
| 5,937,402 * | 8/1999 | Pandit | 707/4 |
| 5,937,409 | 8/1999 | Wetherbee | 707/103 |
| 6,003,040 | 12/1999 | Mital et al. | 707/103 |
| 6,009,428 | 12/1999 | Kleewein et al. | 707/10 |
| 6,038,565 | 3/2000 | Nock | 707/101 |
| 6,049,673 | 4/2000 | McComb et al. | 717/11 |

FOREIGN PATENT DOCUMENTS

| | | |
|---|---|---|
| 0 472 812 A1 | 2/1991 | (EP) . |
| WO 95/03586 | 2/1995 | (WO) . |
| WO 95/04960 | 2/1995 | (WO) . |
| WO 97/03406 | 1/1997 | (WO) . |

OTHER PUBLICATIONS

Fitsilis et al., "Producing Database Schemata from an Object Oriented Design", IEEE, pp. 251–257 (1994).

(List continued on next page.)

Primary Examiner—Thomas G. Black
Assistant Examiner—William Trinh
(74) Attorney, Agent, or Firm—Finnegan, Henderson, Farabow, Garrett & Dunner, L.L.P.

(57) ABSTRACT

An object-relational mapping tool that can process views is provided. In processing views, the object-relational mapping tool identifies the dependency relationship between the various views and tables and allows the programmer to customize the mapping that will occur by selectively determining which tables and views get mapped. This customization allows the mapping tool to map an individual table or view or to map (1) all tables and views, (2) all tables only, and (3) tables and views for which there are no dependencies. Also, the mapping tool allows the programmer to view and set the updatability of a particular view or table.

26 Claims, 9 Drawing Sheets

OTHER PUBLICATIONS

King, Nelson, "Java in the Database Server" (Jun. 1998), URL http://www.dbmsmag.com/9806d13.html, pp. 1–8.

Sun Microsystems, "Java Blend Tutorial", Java Software Division, pp. 1–76 (Jun. 1998).

T. Lindholm and F. Yellin, "The Java Virtual Machine Specification" Second Edition, Apr. 1999, pp. 1–473.

"Customizable Four Pane Layout for Database Table Definition," Dec. 1992, pp. 268–269.

H. Bank, "OQL," Sep. 15, 1997 (Rev. 0.11), pp. 1–7.

"Applications in Java and Extended Java," Sep. 28, 1998, pp. 1–21.

"Sun Simplifies Database Programming with Java Blend," Aug. 21, 1997, pp. 1–3.

S. Wang, "Improvement of Concurrency Control Within Object–Oriented Database Systems," Apr. 5, 1990, IEEE, pp. 68–70.

S. Heiler and S. Zdonik, "Object Views: Extending the Vision," 1990 IEEE, pp. 86–93.

D. Agrawal, A. Bernstein, P. Gupta, and S. Sengupta, "Distributed Multi–Version Optimistic Concurrency Control for Relational Database," Mar. 1986, pp. 416–421.

X. Qian and L. Raschid, "Query Interoperation Among Object–Oriented and Relational Databases," Mar. 6, 1995, IEEE, pp. 271–278.

S. Gantimahapatruni and G. Karabatis, "Enforcing Data Dependencies in Cooperative Information Systems," May 12, 1993, IEEE, pp. 332–341.

IBM Technical Disclosure Bulletin, vol. 38, No. 01, Jan. 1995, Fast and Secure Stored Procedures for a Client/Server DBMS, pp. 79–82.

A. Alashqur and C. Thompson, "O–R Gateway: A System for Connecting C++ Application Programs and Relational Databases," Aug. 10, 1992, pp. 151–169.

R. Ahad and T. Cheng, Hewlett–Packard Journal 44 (1993) Jun., No. 3, "HP OpenODB: An Object–Oriented Database Management System for Commerical Applications," pp. 20–30.

TOPLink, "The Industry Standard for Persistence PRoduct, A White Paper: The Object People", 1997.

IBM Technical Disclosure Bulletin, vol. 37, No. 08, Aug. 1994, "Automatically Revising Function Prototypes in C and C++ Implementations of System Object Model Classes," pp. 363–365.

C. Kleissner, "Enterprise Objects Framework, A Second Generation Object–Relational Enabler," Jun. 1995, pp. 455–459.

"The Enterprise Objects Framework," Jul. 1994, pp. 1–12.

SQL Tutorial: Introduction to Structured Query Language, Version 3.63 (May 1998).

The JDBC Database Access API (Apr. 1998).

O'Brien, Stephen K., "Turbo Pascal 5.5: The Complete Reference", Osborne/McGraw–HIll (1989), pp. 500–522.

Hamilton, Cattell, and Fisher, "JDBC Database Access with Java™", Addison–Wesley (1997).

* cited by examiner

OBJECT-RELATIONAL MAPPING TOLL THAT PROCESSES VIEWS

RELATED APPLICATIONS

The following identified U.S. patent Ser. applications are relied upon and are incorporated by reference in this application.

Provisional U.S. Patent Application No. 60/068,415, entitled "System and Method for Mapping Between Objects and Databases," filed on Dec. 22, 1997.

U.S. patent application No. 09/106,189, entitled "Evolution of Object-Relational Mapping Through Source Code Merging," and filed on the same date herewith.

U.S. patent application Ser. No. 09/105,957, entitled "Integrating Both Modifications to an Object Model and Modifications to a Database into Source Code by an Object-Relational Mapping Tool," and filed on the same date herewith.

U.S. patent application Ser. No. 09/106,210, entitled "Rule-Based Approach to Object-Relational Mapping Strategies," and filed on the same date herewith.

U.S. patent application Ser. No. 09/106,212, entitled "User Interface for the Specification of Lock Groups," and filed on the same date herewith.

U.S. patent application Ser. No. 09/106,119, entitled "A Fine-Grained Consistency Mechanism for Optimistic Concurrency Control Using Lock Groups," and filed on the same date herewith.

U.S. patent application Ser. No. 09/106,211, entitled "User Interface for the Specification of Index Groups Over Classes," and filed on the same date herewith.

U.S. patent application Ser. No. 09/106,188, entitled "Method and Apparatus for Creating Indexes in a Relational Database Corresponding to Classes in an Object-Oriented Application," and filed on the same date herewith.

U.S. patent application Ser. No. 09/106,190, entitled "Method and Apparatus for Loading Stored Procedures in a Database Corresponding to Object-Oriented Data Dependencies," and filed on the same date herewith.

U.S. patent application Ser. No. 09/106,046, entitled "An Integrated Graphical User Interface Method and Apparatus for Object-to-Database and Database-to-Object Mapping," and filed on the same date herewith.

U.S. patent application Ser. No. 09/105,955, entitled "Methods and Apparatus for Efficiently Splitting Query Execution Across Client and Server in an Object-Relational Mapping," and filed on the same date herewith.

BACKGROUND OF THE INVENTION

1. Field of the Invention

The present invention relates generally to data processing systems and, more particularly, to an object-relational mapping tool that processes database views.

2. Description of the Related Art

To facilitate development of application programs that utilize relational databases, object-relational mapping tools have been developed. In general, relational databases store data in tables having rows (records) and columns (fields). The tables are usually interrelated, and thus, there is a logical structure imposed on the database. This logical structure is known as a schema. Object-relational mapping tools read a database and automatically generate source code. The source code that is generated contains a number of classes whose interrelationship reflects the logical structure, or schema, of the database. A class, such as a Java™ class, is a data structure containing both data members that store data and function members (or methods) that act upon the data. The source code contains one class for each table in the database, and each class has a data member for each column in the corresponding table. Additionally, the classes contain function members that are used to both get and set the values of the data members and, eventually, update the database.

By using an object-relational mapping tool, a programmer can easily generate source code to facilitate database application development. After the mapping tool generates the source code, the programmer writes code to interact with only the classes in the generated source code and not the database, thus hiding the complexities of interacting with the database from the programmer. This allows a programmer who is familiar with object-oriented programming to code against familiar classes and not unfamiliar, sometimes cumbersome to use, database query languages.

The tables contained in a database are interrelated to each other by primary and foreign keys. Each table may have a primary key, comprising one or more columns, that uniquely identifies a row in the table. Foreign keys, on the other hand, are used to associate a row in one table with one or more rows in another table.

For example, a business may store customer information in a database. Such a database, depicted above, may contain a Customer table and an Order table. The Customer table comprises a column for storing a customer's name and a column for storing a customer's unique identification number. The primary key for the Customer table is the customer identification column because it uniquely identifies each customer in the table and, most likely, will not change.

The Order table comprises a column for storing the purchase number, a column for storing the store where the order was placed, a column for storing the date when the order was placed, and a column for storing the customer identification number. Each time a customer places an order, a purchase order number identifies the transaction. Since purchase numbers are unique, the primary key for the Order table is defined as the purchase order column. Accordingly, each time a customer places an order, a new row will be generated containing the purchase order number, the store number, the date, and the customer's identification number. Thus a particular customer could have multiple rows in the order table, each representative of a different order transaction.

The rows in the Customer table are related to the rows in the Order table by a foreign key. The foreign key for the Order table is the customer identification column, which refers to the customer identification column in the Customer table. As such, the data contained in the two tables can be interrelated. Therefore, it is possible, via the customer identification column, to discover the customer name associated with a particular purchase order.

Tables can also have views defined on them. Views are created by query expressions and refer to a subset of one or more tables (i.e. a subset of the rows and/or columns). A view may be defined by one or more columns of the table from which the view is defined, referred to as a base table, or a view may be defined by a combination of columns from multiple base tables. In addition, a view can be nested, where the view is based on one or more previously defined views, referred to as base views.

For instance, as shown below, continuing the prior example, a view can be created containing only the purchase orders placed in 1998 or a view can be created containing only the purchase orders made from store XYZ.

Although beneficial to programmers, conventional object-relational mapping tools suffer from a limitation. When a programmer runs a conventional object-relational mapping tool, the mapping tool does not provide a customizable mapping of views in terms of dependency, updatability, and object mapping of views. Because of this limitation, programmers must develop additional logic in query language and low level database application programming interfaces (API's) to process the views. This makes the code development more difficult and error prone. This is both time consuming and cumbersome. In addition, because updatability and dependencies of views are not captured by conventional mapping tools, any attempt to update a subsequently created view can lead to inconsistent database state. It is therefore desirable to improve object-relational mapping tools.

SUMMARY OF THE INVENTION

In accordance with methods and systems consistent with the present invention, an improved object-relational mapping tool is provided that is able to handle views in its processing so that source code can be automatically generated that uses the views, thus facilitating code development. As part of its ability to handle views, the improved object-relational mapping tool identifies the dependency relationship between relational database base tables, and views and displays this dependency relationship to the programmer so that the programmer can customize the mapping that occurs. That is, the programmer may decide what components of the database should be "mapped" into source code.

This customized mapping includes the ability to automatically 1) map all base tables and all views, regardless of the dependencies among them; 2) map base tables only; and 3) map only top level views and base tables with no views derived from them. In this latter case, the mapping tool maps the highest level view or table, or the table itself if there are no views defined on that table. After this automatic mapping has occurred, a programmer can also manually override this mapping and choose to either map or unmap tables and views.

In addition, the object-relational mapping tool can determine whether or not a view is read-only or whether it can be updated. Furthermore, in the event that the view can be updated, the programmer may specify, during the mapping process, whether the data in the source code corresponding to the view should be read-only or updatable. In this manner, the programmer is able to decide whether or not the ability to update a view should be passed on to the source code, thus providing the programmer with flexibility to enforce an update policy of their choosing.

BRIEF DESCRIPTION OF THE DRAWINGS

The accompanying drawings, which are incorporated in and constitute a part of this specification, illustrate an embodiment of the invention and, together with the description, serve to explain the advantages and principles of the invention. In the drawings.

DETAILED DESCRIPTION OF THE INVENTION

Reference will now be made in detail to an implementation of the present invention as illustrated in the accompanying drawings. Wherever possible, the same reference numbers will be used throughout the drawings and the following description to refer to the same or like parts.

In accordance with methods and systems consistent with the present invention, an improved object-relational mapping tool is provided that can process views stored in a database. In response to a command to import a relational database schema or to open an existing mapping, the improved object-relational mapping tool displays on the computer screen any views contained in the schema, the view's and table's associated dependency, and the updatability status of a particular view. From this information the object-relational mapping tool allows the programmer to map views in a customized manner by permitting the programmer to choose whether or not to change the updatability of a particular view and whether or not to map a view. The mapping tool also allows the programmer to customize object mapping of the views by specifying mapped class properties. All of these features facilitate the programmer's development of a database application by automatically generating source code that utilizes views to the programmer's specifications.

The term "mapping" refers to the ability to tie a relational model of data, as it is modeled by the schema of a relational database, to an object-oriented model, or vice-versa. By using the improved object-relational mapping tool, a programmer can translate the interrelated data of the relational model to a set of interrelated classes containing data and associated behaviors. Likewise, the object-oriented model can be translated to a relational database.

Dependent relationships exist between views and tables. A view can be derived from one or more underlying views or tables. In general, when a view is derived on a single or multiple base tables or other views, that view is considered dependent on the underlying base table(s) or underlying view(s). Because the object-relational mapping tool is able to identify dependencies in the relational database schema, it is possible for the object-relational mapping tool to display the hierarchical relationships.

This dependency detection and display feature provides the programmer with great flexibility in deciding what tables and views to map. In particular, the programmer may (1) map all base tables and all views, regardless of the dependancies among them; (2) map base tables only; and (3) map only tables and views upon which there are no dependencies. In this latter case, the object-relational mapping tool maps the highest level view of a table, or the table itself if there are no views defined on that table. In addition, the programmer may manually override any individual mapping decision, providing an additional level of flexibility to the programmer.

When the improved object-relational mapping tool imports a schema that may or may not contain views, it applies a default mapping option to it. For example, the default may be to map all views and tables; in which case, when the schema is imported, the mapping tool automatically maps all views and all tables.

Independent of the default mapping setting, the programmer can customize the initial schema mapping through the mapping tool user interface. Thus, after a schema has been imported and mapped, a programmer can individually map or unmap a view or table. The mapping tool user-interface windows display the view's dependency on other tables or views. After default mapping occurs, the mapping tool gives the programmer a choice of leaving the mapping status for a particular view table as is or manually unmapping all of them. Note that if all the dependent views and tables are currently unmapped, this has no effect. This manual mapping feature also has a global feature which maps or unmaps entire sets of views and tables.

Also, the programmer can customize the updatability of a selected view (i.e., designate whether or not a mapped view will be updatable or read-only). Specifically, the mapping tool detects the updatability of a view by interpreting the view's definition. Once the mapping tool identifies the updatability of a particular view, the programmer can customize the mapping of that view by overriding the default updatability, initially identified by the mapping tool.

In addition, a programmer can customize the class generated for a view by explicitly deleting all modifier methods (i.e., set methods), thereby providing a non-updatable object veneer over the underlying view. This is yet another way for a programmer to customize the updatability of a view.

Finally, the mapping tool provides a global option to allow importing of all views to be either updatable or read-only. However, the programmer can customize the global setting by selectively overriding the updatability of a selected view.

Implementation Details

Figure 1:
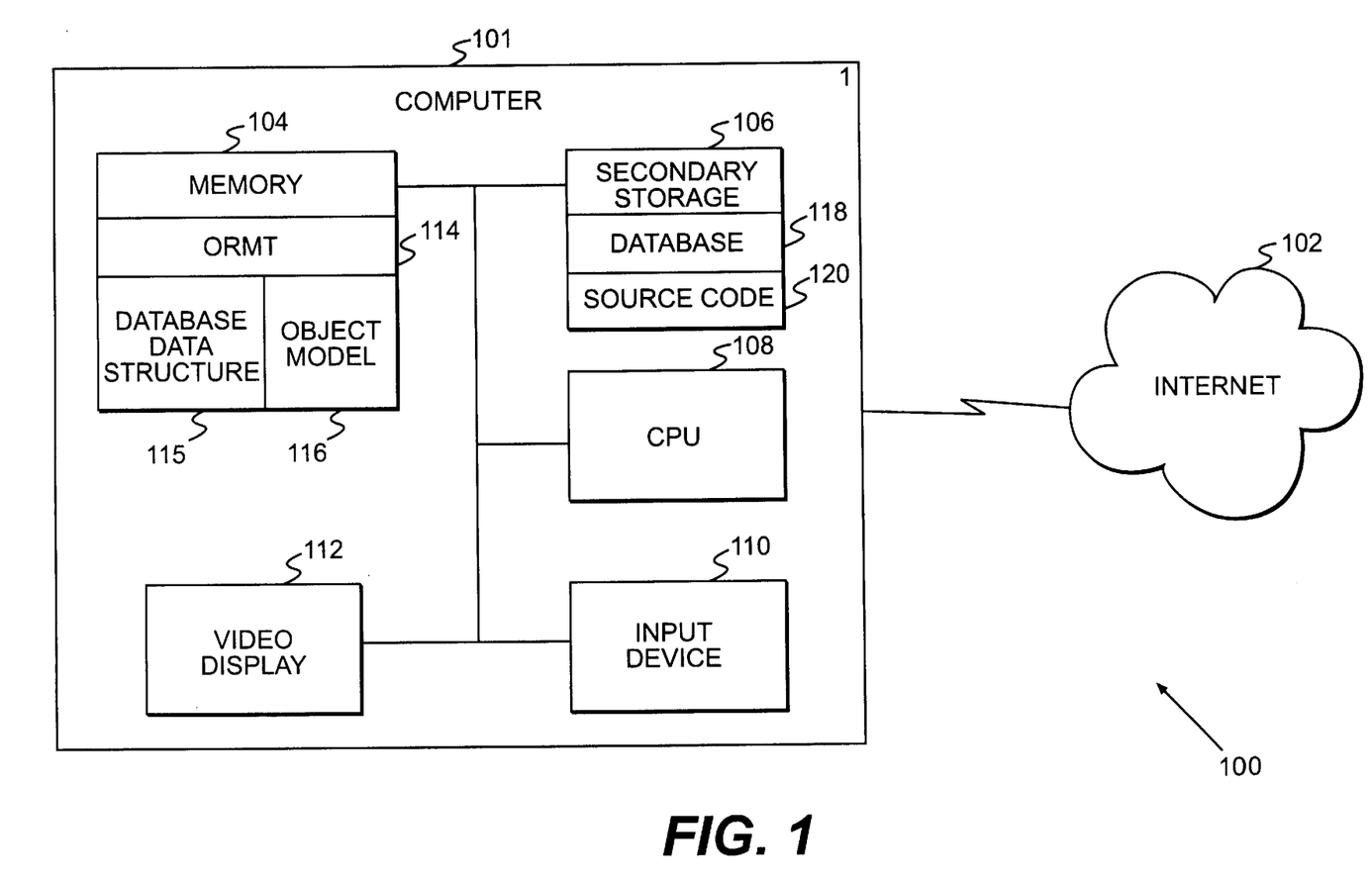
FIG. 1 is a diagram of a data processing system suitable for practicing methods and systems consistent with the present invention.

FIG. 1 depicts a data processing system 100 suitable for use with methods and systems consistent with the present invention. Data processing system 100 includes computer 101 connected to the Internet 102. Computer 101 includes memory 104, secondary storage device 106, central processing unit (CPU) 108, input device 110, and video display 112. Memory 104 includes an object-relational mapping tool 114 in accordance with methods and systems consistent with the present invention. In turn, the object-relational mapping tool 114 contains database data structure 115, reflecting the schema of database 118, stored on secondary storage device 106, and contains object model 116, which includes all of the information necessary to generate source code. Also stored on secondary storage device 106 is source code 120, containing classes reflecting the object model 116.

Although computer 101 is depicted with various components, one skilled in the art will appreciate that this computer can contain additional or different components. Additionally, although computer 101 is shown connected to the Internet 102, computer 101 may be connected to other networks, including other wide-area networks or local-area networks. Furthermore, although aspects of the present invention are described as being stored in memory, one skilled in the art will appreciate that these aspects can also be stored on or read from any other type of computer-readable media, such as secondary storage devices, like hard disks, floppy disks, or CD-ROM; a carrier wave from a network, such as the Internet; or other forms of RAM or ROM. Sun, Sun Microsystems, the Sun logo, Java, and Java-based trademarks are trademarks or registered trademarks of Sun Microsystems Inc. in the United States and other countries.

The object-relational mapping tool 114 reads database 118 to examine its schema, constructs database data structure 115 to reflect this schema, generates an object model 116 based on the database data structure 115 containing all of the information necessary to create classes, and then creates source code 120 based on object model 116. As stated above, this source code is used by the programmer to facilitate database application development.

Figure 2:
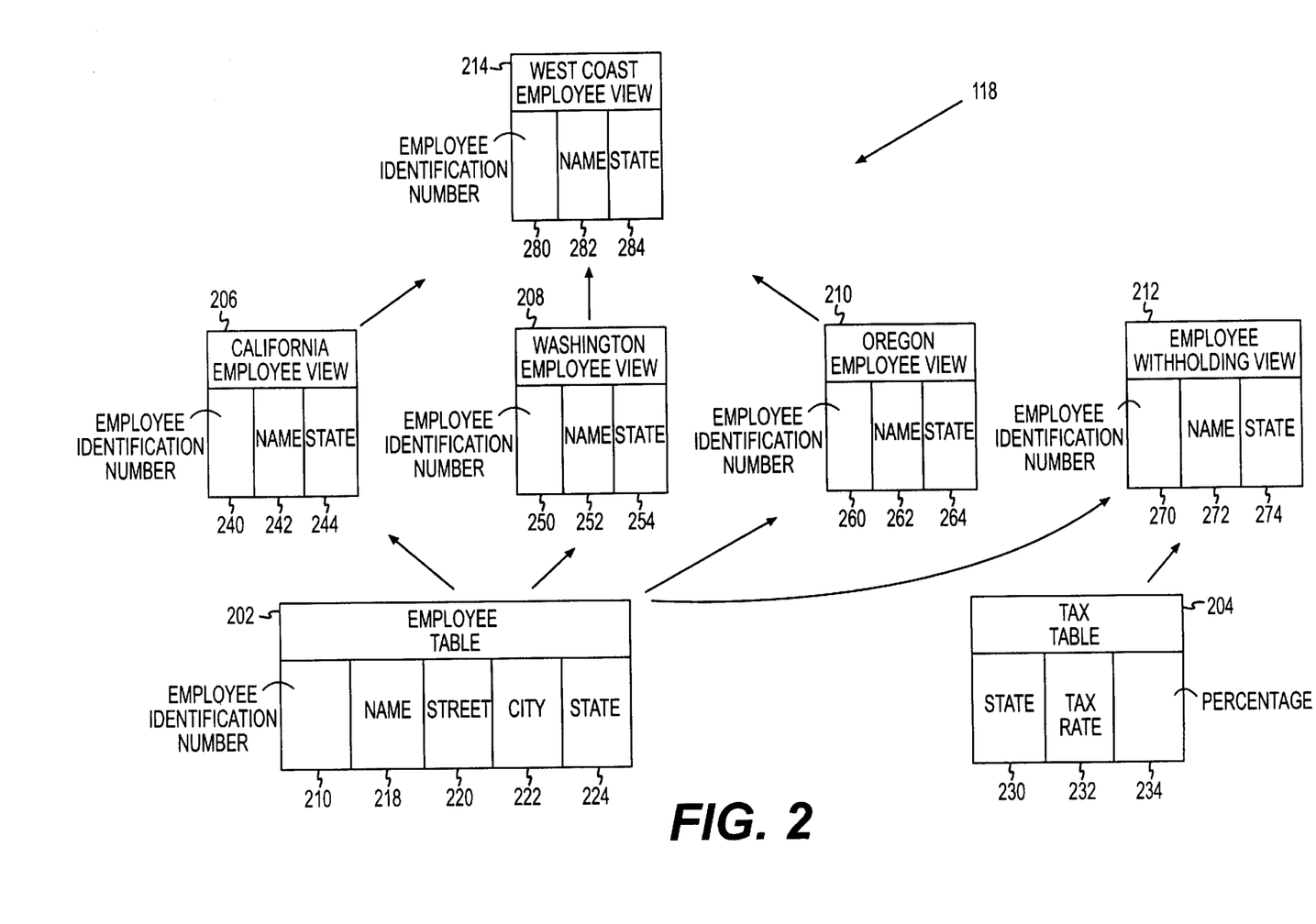
FIG. 2 is a more detailed diagram of the database depicted in FIG. 1.

An example of a relational database 118 is depicted in FIG. 2. FIG. 2 depicts the various tables and views contained in database 118. Database 118 includes an Employee table 202, a Tax table 204, and five dependent views: a California Employee view 206, a Washington Employee view 208, an Oregon Employee view 210, an Employee Withholding view 212, and a West Coast Employee view 214. Note, that views, by their nature, are dependent since they are created from tables or even other views.

The Employee table 202 comprises five columns: a column of employee identification numbers 216, a column of employee names 218, and three columns representing an employee's address: street 220, city 222, and state 224, respectively. The Tax table 204 comprises three columns: a column for states 230, a column for tax withholding 232, and a column for tax percentage 234. Both the Employee table 202 and the Tax table 204 are referred to as base tables because other views depend from them.

The California Employee view 206, the Washington Employee view 208, and the Oregon Employee view 210 have an employee identification number column 240, 250, and 260 respectively, a name column 242, 252, and 262, respectively, and a state column 244, 254, and 264, respectively. The California, Washington, and Oregon Employee views 206–210 are all defined from the Employee base table 202. Each of these three views represent the employees that reside in the respective states.

The West Coast Employee view 214 represents all the employees that reside on the West Coast, including California, Washington and Oregon. The West Coast Employee view 214 comprises a employee identification number column 280, a name column 282, and a state column 284. This view is dependent on (or defined from) the California view 206, the Washington view 208, and the Oregon view 210. Since the three state views 206, 208, and 210 have another view that depends on them, the West Coast Employee view 214, they are each referred to as base views.

The Employee Withholding view 212, comprising a employee identification number column 270, a name column 272, and a state column 274, is defined in (or is dependent on) the Employee base table 202 and the Tax base table 204. This view comprises columns from both of these base tables.

Figure 3A:
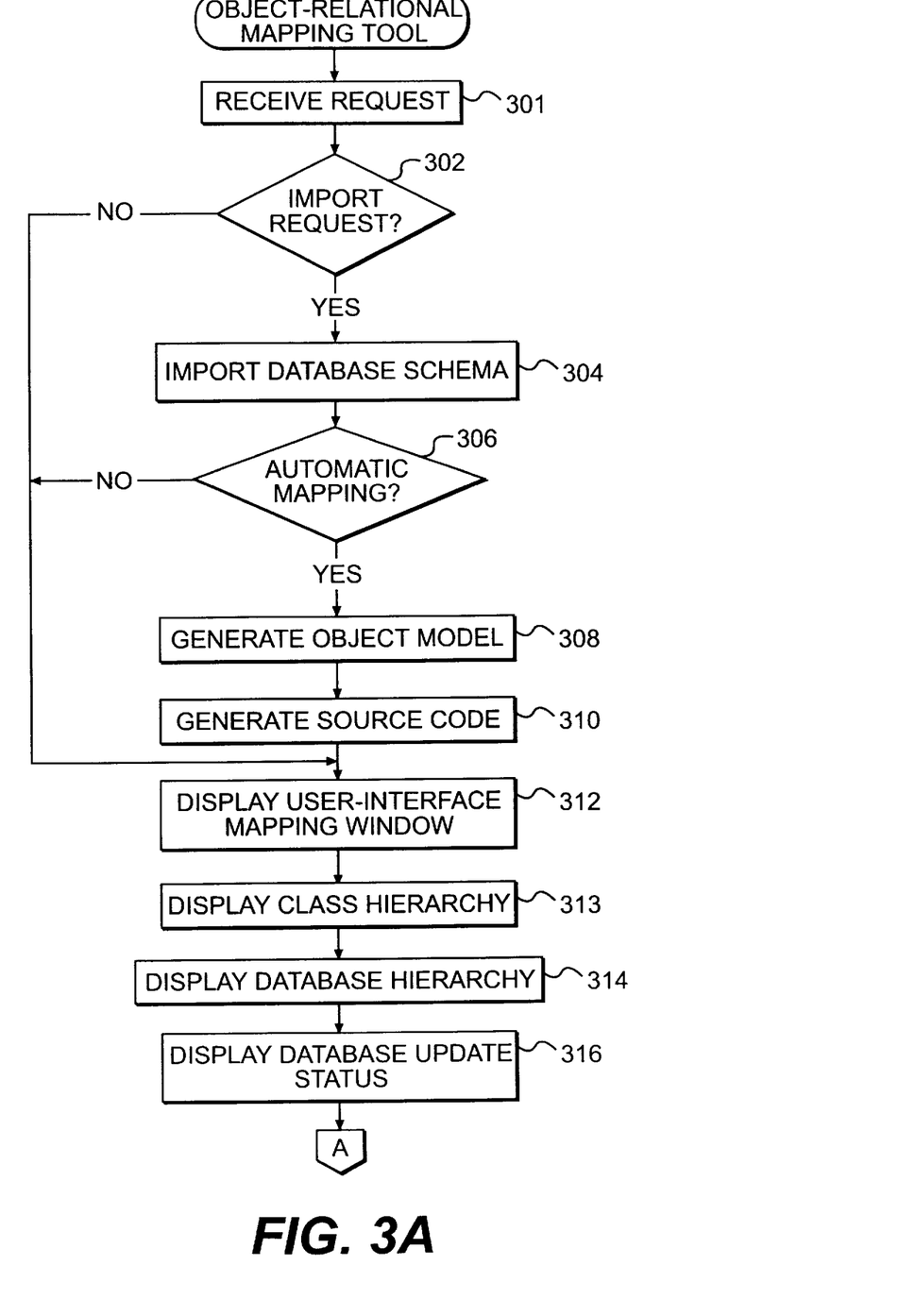
FIGS. 3A and 3B depict a flow chart of the states performed by the object-relational mapping tool depicted in FIG. 1 in response to a request to import a database schema or to open a previously imported schema.
Figure 3B:
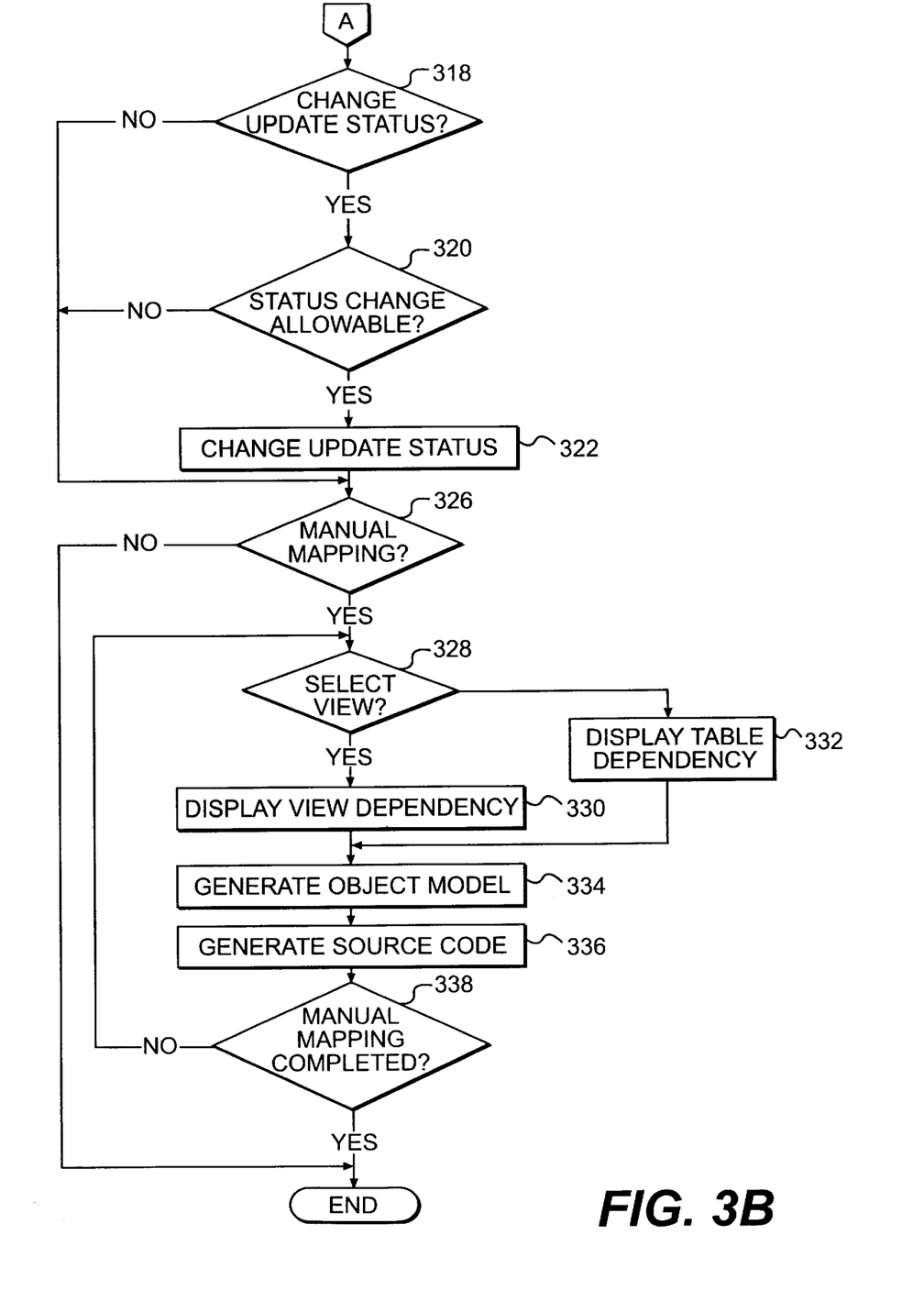

FIGS. 3A and 3B depict a flow chart of the states performed by the object-relational mapping tool when displaying, customizing, and mapping relational database schemas that contain views. The first state performed by the mapping tool is to receive a request from the programmer to either input a database schema or open a file containing a previously imported database schema (state 301). A previously imported database schema can be saved as either a database data structure (i.e., after importation but before mapping) or as an object model (i.e., after both importation and mapping). If it is determined in state 302 that a previously imported database schema (stored in a file) is being opened, the object-relational mapping tool proceeds to state 312.

However, if the object-relational mapping tool determines that the request received is to import a relational database schema, the object-relational mapping tool imports the schema (state 304). In this state, the mapping tool imports the database schema using the Java database connectivity API (JDBC) available from Sun Microsystems of Palo Alto, Calif. JDBC is a Java API for executing SQL statements. It consists of a set of classes and interfaces written in the Java programming language. JDBC provides a standard API for tool/database developers and makes it possible to write database applications using a pure Java API. JDBC is described in greater detail in Hamilton, Cattell, and Fisher, *JDBC Database Access with Java*, Addison-Wesley (1997), which is incorporated herein by reference.

When a database schema is imported, database data structures are created to reflect both the views and the tables found in the database schema. For example, if the database schema 118 depicted in FIG. 2 was imported, the object-relational mapping tool would create seven data structures, five data structures for each of the five views 206, 208, 210, 212, and 214 and two data structures for the two tables 202 and 204, each data structure contains information regarding the corresponding table or view, including column interaction, primary key information, and foreign key information, view definition, view updatability, and view dependency.

After a database schema has been imported, the mapping tool determines if automatic mapping has been previously requested (state 306). The mapping tool contains an edit menu which allows the programmer to specify if automatic mapping is to take place during the importation process. There are three types of automatic mapping performed by the mapping tool. In the first case, the mapping tool will automatically map all tables and all views. In the second case, the mapping tool will automatically map only the base tables and not any views. In the third case, the mapping tool will automatically map only top level views and tables, in which case only tables and views upon which there are no dependencies will be mapped. With this latter option, the mapping tool maps the highest level view of a table or the table itself if there are no views defined on that table.

For example, if the database schema 118 depicted in FIG. 2 were imported, and the automatic mapping feature were previously set to map all views and tables (i.e., type one), the, object-relational mapping tool would automatically map the data structures associated with all five views, 206, 208, 210, 212, and 214 and both tables, 202 and 204. On the other hand, if automatic mapping feature was previously set to map only top level views and tables (i.e., type three), the object-relational mapping tool would only automatically map the data structures associated with West Coast Employee view 214 and the Employee Withholding view 212.

If the automatic mapping feature is set in state 306, the object-relational mapping tool generates an object model reflecting each data structure that is to be automatically mapped (state 308). The object model 116 represents an intermediate form of the information for a class before it is written in source code. Specifically, the object model contains all of the information necessary to create each class in the source code, including data member information, class methods information, field information, selective setting for modifier and accessor methods, and relationship information. Thus, if a particular table or view is to be mapped, the object-relational mapping tool will create a corresponding object in the object model. If, on the other hand, a particular table or view is to be unmapped, then the object-relational mapping tool will delete the corresponding object in the object model.

In addition, based on the attributes of a particular database structure, the object-relational mapping tool will set various flags that serve to notify the object-relational mapping tool to generate methods corresponding to the flags when the source code is generated. Thus, if a particular view is updatable, then the object-relational mapping tool will set a flag so that modifier methods for the view's corresponding field(s) in the mapped class will be generated in the source code.

Once the object model has been created, the object-relational mapping tool creates a source code file containing classes represented by the object in the object model (state 310). In particular, the object-relational mapping tool will generate classes with methods and data members that represent the object model. Thus, for instance, if a particular mapped object, representing a view, is read-only, then only "get methods" for all fields of the class will be generated. In addition, if a mapped view was previously updatable and is now being changed to read-only, the object-relational mapping tool will only create "get methods" for each field of the class. Also, the modifier and accessor methods for these classes can be enabled or disabled selectively as part of the mapping customization process.

The states performed by the object-relational mapping tool when generating a source code file from an object model, the importation of a database schema, and the generation of an object model from an imported database schema, are described in greater detail in co-pending U.S. application Ser. No. 09/106,048, entitled "An Integrated Graphical User Interface Method and Apparatus for Object-to-Database and Database-to-Object Mapping" which has previously been incorporated by reference and in co-pending U.S. application Ser. No. 09/105,957, entitled "Integrating Both Modifications To An Object Model And Modifications To A Database Into Source Code By An Object-Relational Mapping Tool" which has previously been incorporated by reference.

After the source code is automatically generated for the selected views and tables, or if automatic mapping was not selected, or if the mapping tool is merely opening a previously saved imported database schema, the object-relational mapping tool displays the mapping status in a user-interface mapping window (state 312). The user-interface mapping window provides a mapping summary of the imported database schema, its corresponding database structures, object models, and source code. In addition, the user-interface mapping window allows the programmer to customize the mapping, via programmer interaction with the display screen.

Figure 4:
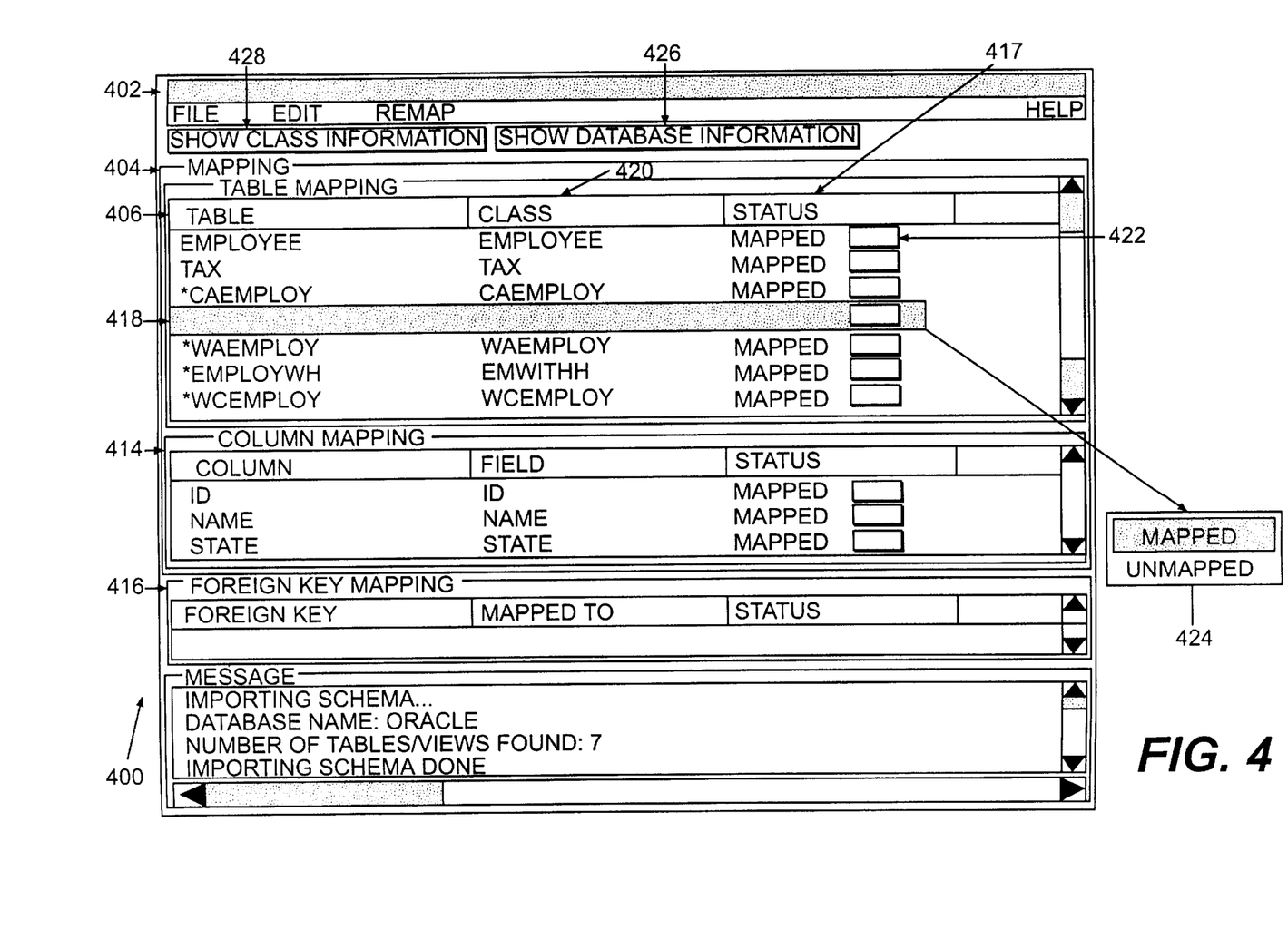
FIG. 4 depicts the display screen produced by the object-relational mapping tool depicted in FIG. 1 after a relational database has been imported.

As shown in FIG. 4, the user-interface mapping window 400, in part, contains a mapping status section 404 which displays mapping status for each table or view in the database schema, the associated column status for a selected table or view 414 and the associated foreign key information 416. The mapping status section 404 displays data structure (i.e., table and view) information 406, object model information 420, and status information 418 indicating whether or not the table was mapped. Note, the mapping tool differentiates views from tables by marking names of views with an asterisk (e.g., view 418). Associated with OREMPLOY in the class column 420 is the class Oremploy, indicating that a mapped class has been generated. In addition, source code has been generated, as indicated by the mapped indicator 417.

Note, that if an object model for a particular data structure was not previously generated, the associated class indicator 420 would be blank. Thus, for instance, if there was no automatic mapping for a particular table or view upon importation, the class column 420 and the mapped indicator column 417 would be blank.

Figure 5:
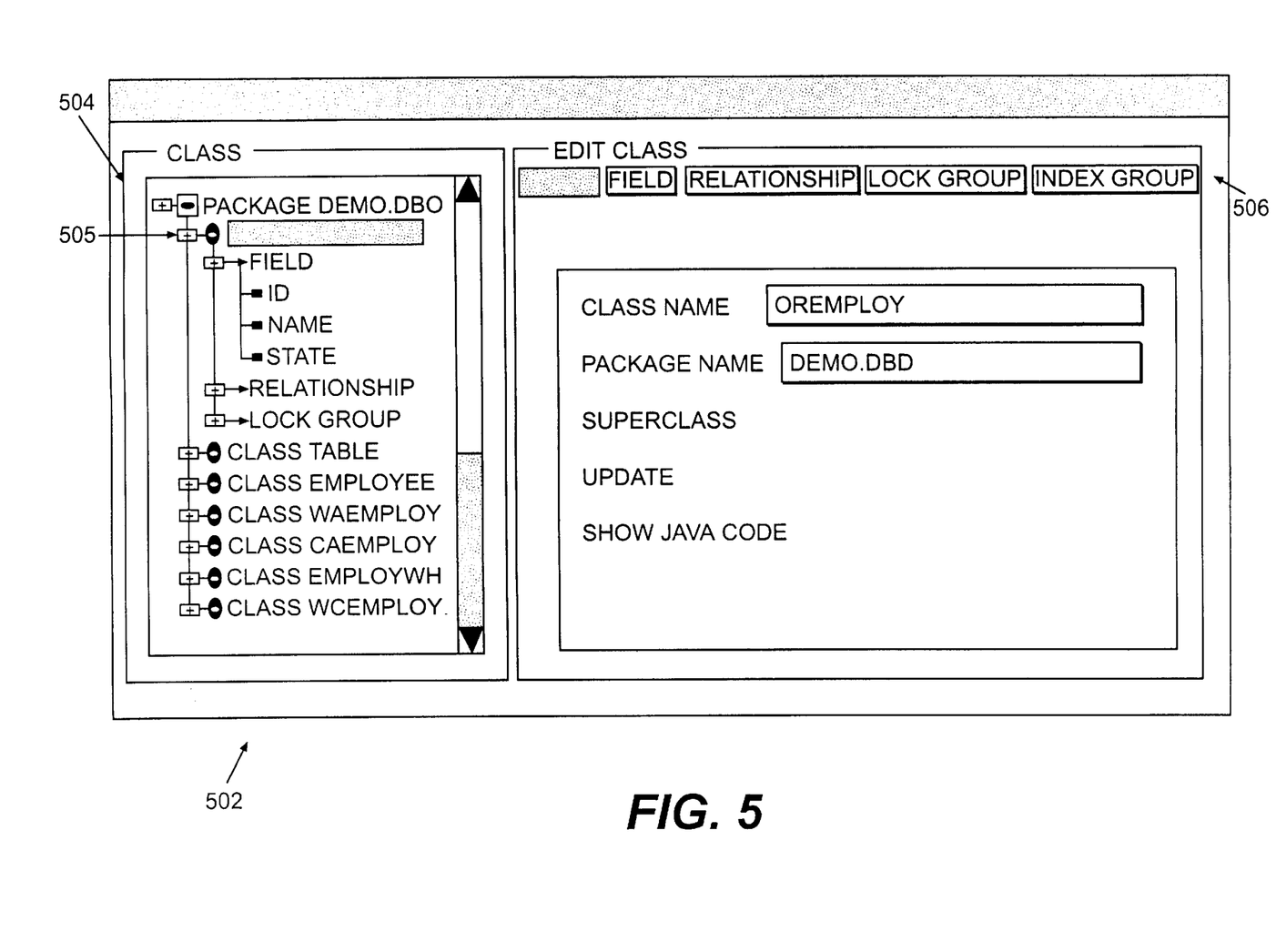
FIG. 5 depicts the display screen produced by the object-relational mapping tool depicted in FIG. 1 in response to a request to view class information.

After displaying the user-interface mapping window 400, the programmer may view hierarchical information by selecting the show class information button 428 (state 313). This hierarchical information is displayed in the class information window 502 depicted in FIG. 5. Specifically, the hierarchical information appears in the class section 504 and information associated with the selected class appears in the edit class section 506. By selecting a particular class (e.g. class 505), the fields and other related information (e.g., relationships and lock groups) will appear under the selected class in the class section 504. Additional information can also be displayed, by first selecting a particular class (e.g. class 505) and then by selecting any of the four buttons in the edit class section 506. Note, however, that the class information window 502 will not contain any class or class hierarchy information for a particular view or table if that view or table has not yet been mapped.

Figure 6:
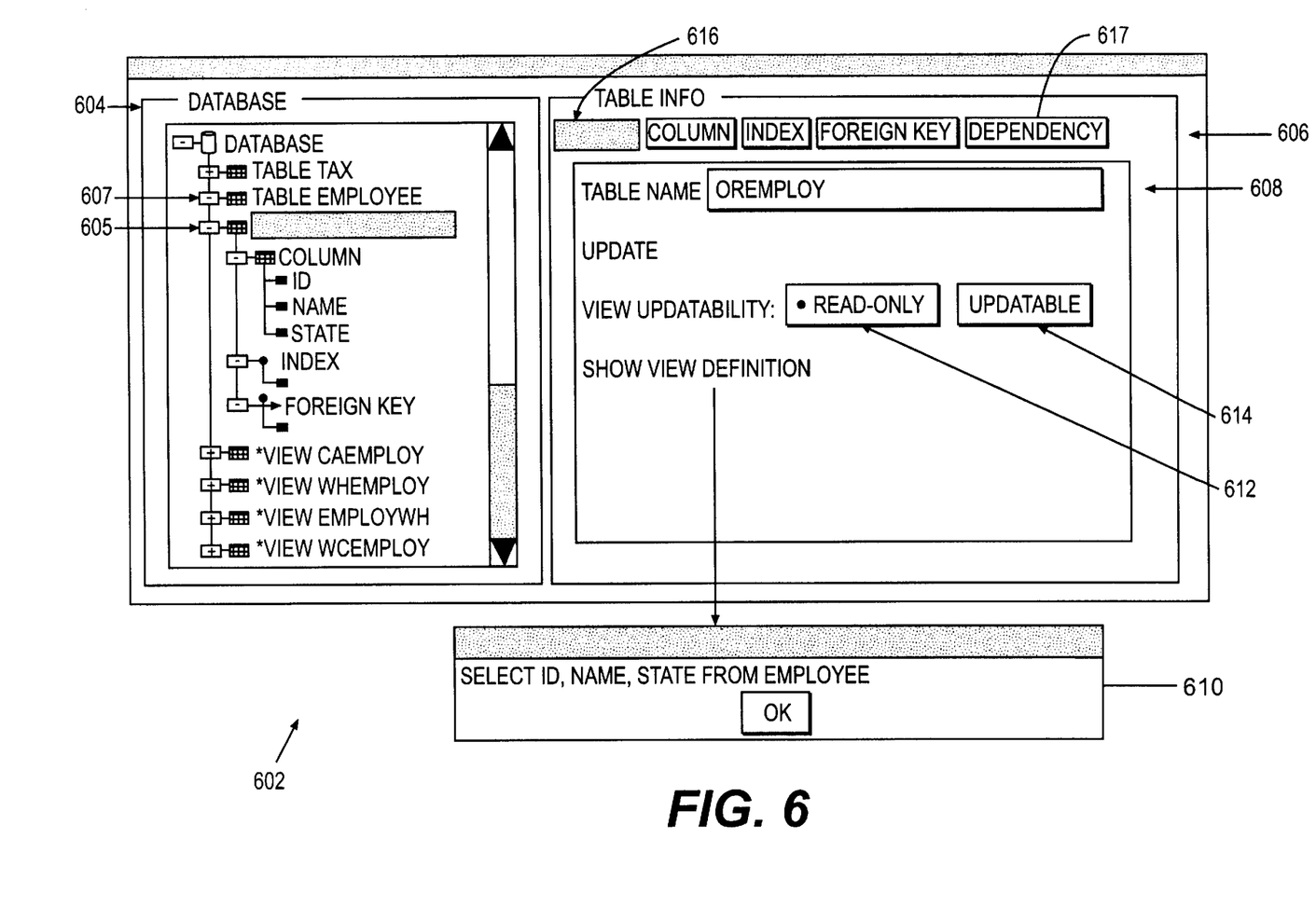
FIG. 6 depicts the database information window display screen produced by the object-relational mapping tool depicted in FIG. 1 in response to a request to view database schema information.

After displaying class information in state 313, the programmer may view hierarchical database information by selecting the show database information button 426 from the user-interface mapping window (state 314). As depicted in FIG. 6, the database information window 602 contains a database section 604, which displays information about a view's dependency on other tables and views. This feature provides a way for programmers to determine how a view's hierarchy has been derived from its underlying associated base set of tables.

Thus, a programmer can select a view in the database screen 604 and look at the view's dependency by examining the other folders in the list. For example, for OREMPLOY view 605, the list of folders will have an item corresponding to table EMPLOYEE 607. The complete view and table hierarchy information is an additional feature from which assists the programmer in determining whether or not to map a view.

The database information display window 602 also allows the programmer to determine whether or not a particular view is updatable or read-only by selecting a particular view (e.g. view 605) and by selecting the Table Info button 616 (state 316). After selecting the Table Info Button 616, the object-relational mapping tool will display an indication 612 of whether the selected view is read-only and an indication 614 of whether the selected view is updatable. The mapping tool determines whether a view is updatable or read-only by using low-level database interface and query language and then displays that information on the display screen 608.

After viewing the updatability of a view, the programmer determines whether or not to change the updatability if that view (state 318 in FIG. 3B). Again, the programmer selects a particular view by selecting a view in the database section 604 of the database information window 602. The programmer may change a view's updatability by toggling the view updatability buttons 612, 614. The mapping tool uses the underlying database model in conjunction with the display screen 608 to set a view's updatability.

To assist the programmer in deciding whether to set a view to be updatable or read-only, the programmer can display the view's definition 610, (i.e., the fields that comprise the view and the underlying view(s) or table(s) from which the view is derived). Since the underlying database interprets the updatability of a view based on how the view has been derived, the view definition information becomes a useful resource to the programmer when deciding whether or not to customize a view's updatability.

Finally, if the programmer sets a view to be updatable, the mapping tool, via the JDBC interface to the database, determines whether or not the underlying database can support such a setting (state 320). In other words, if the underlying view in the database is read only, then the mapping tool will not allow the programmer to customize a view to be updatable. If the programmer is able to successfully customize a view to be updatable, then the mapping tool enables the modifier methods (i.e., set methods) in the mapped class for the view. Likewise, if an updatable view is customized to be read-only, the mapping tool disables all the modifier methods (i.e., set methods) in the mapped class for that view. Nevertheless, the changes by the mapping tool to the accessor (i.e., get methods) or modifier methods (i.e., set methods) can be selectively overridden by the programmer by interfacing with the class information window 502 in FIG. 5, which was discussed above.

If the programmer did not choose to modify the updatability of a particular table or view, or if the programmer was unable to modify the updatability of a particular table or view, or if the programmer successfully modified the updatability of a particular table or view, the programmer can now determine whether or not to manually map a particular table or view (state 326). If the programmer decides not to manually map a particular view or table, processing ends.

However, once the programmer decides to manually map a table or a view in state 326, the programmer must next select the table or view to map (state 328). A table or view is manually mapped by interacting with the user-interface mapping display window 400 depicted in FIG. 4. First, the programmer selects a particular table or view (e.g. view 418). By selecting a particular table or view, the user-interface mapping tool highlights the entire row of information associated with the selected table or view (e.g. view 418). Next, the programmer simply selects the selection button (417) associated with the highlighted row (e.g. view 418). Once the appropriate selection is made and the object-relational mapping tool produces a selection box 424, the programmer simply toggles the selection 424, thereby instructing the object-oriented mapping tool to either map or unmap the selected table or view.

Figure 7:
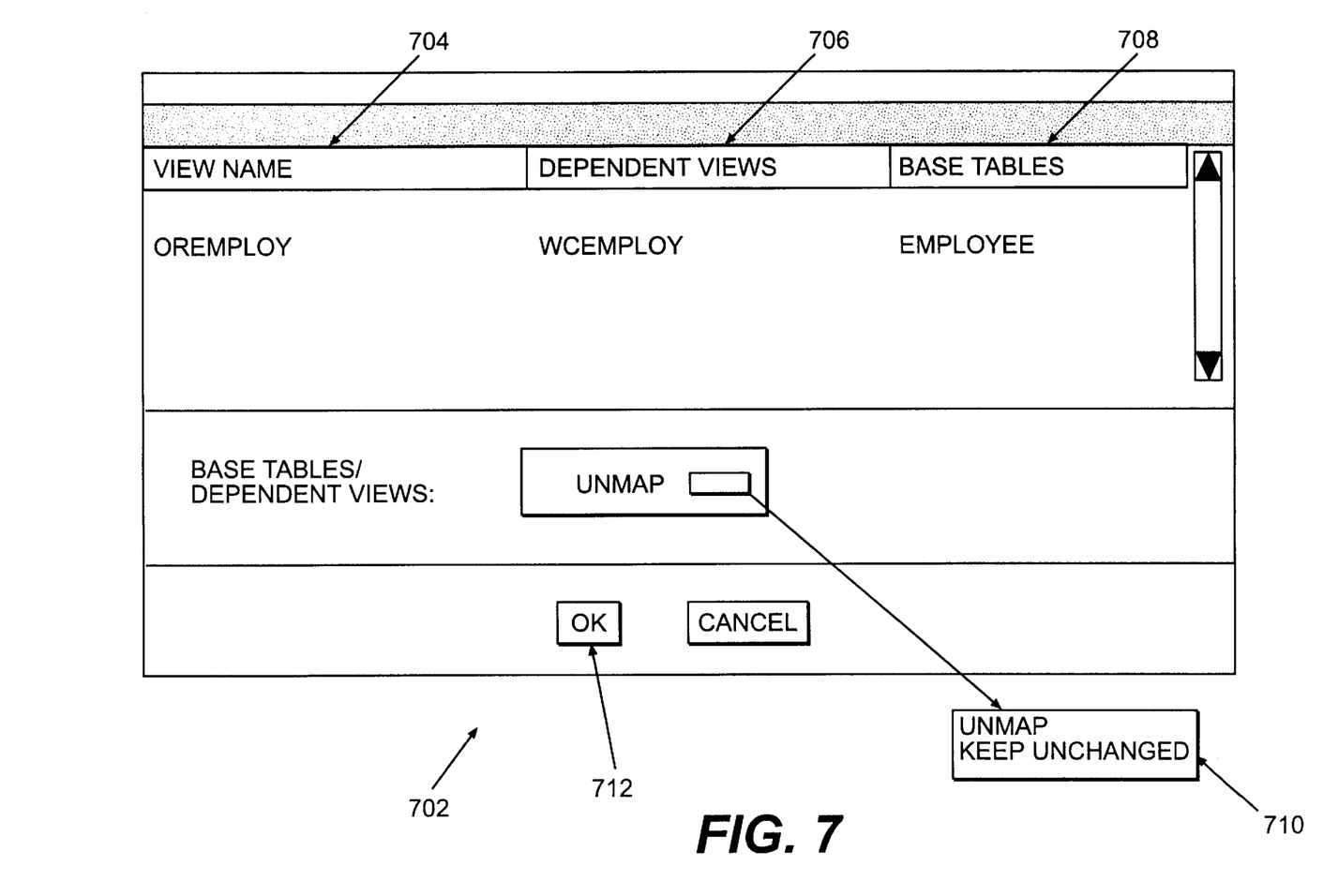
FIG. 7 depicts a display screen produced by the object-relational mapping tool depicted in FIG. 1 in response to a request to map a view that has dependencies and base tables that are also mapped.

In response to the manual mapping request in state 326, the object-relational mapping tool determines whether the request is to map a table or to map a view (state 328). If the programmer requests to map a view, the object-relational mapping tool displays a view dependency window (state 330). The view dependency window 702 depicted in FIG. 7 is automatically displayed by the object-relational mapping tool when the selected view 704 that is about to be mapped has dependent views 706 or dependent base tables 708 that are already mapped. The view dependency window allows the programmer, in conjunction with mapping the selected view 712 to unmap the dependent views and tables or keep their status unchanged 710. Once the programmer determines whether or not to unmap or leave unchanged the dependent views and tables, the programmer selects the OK button 712 to initiate the mapping procedure.

Figure 8:
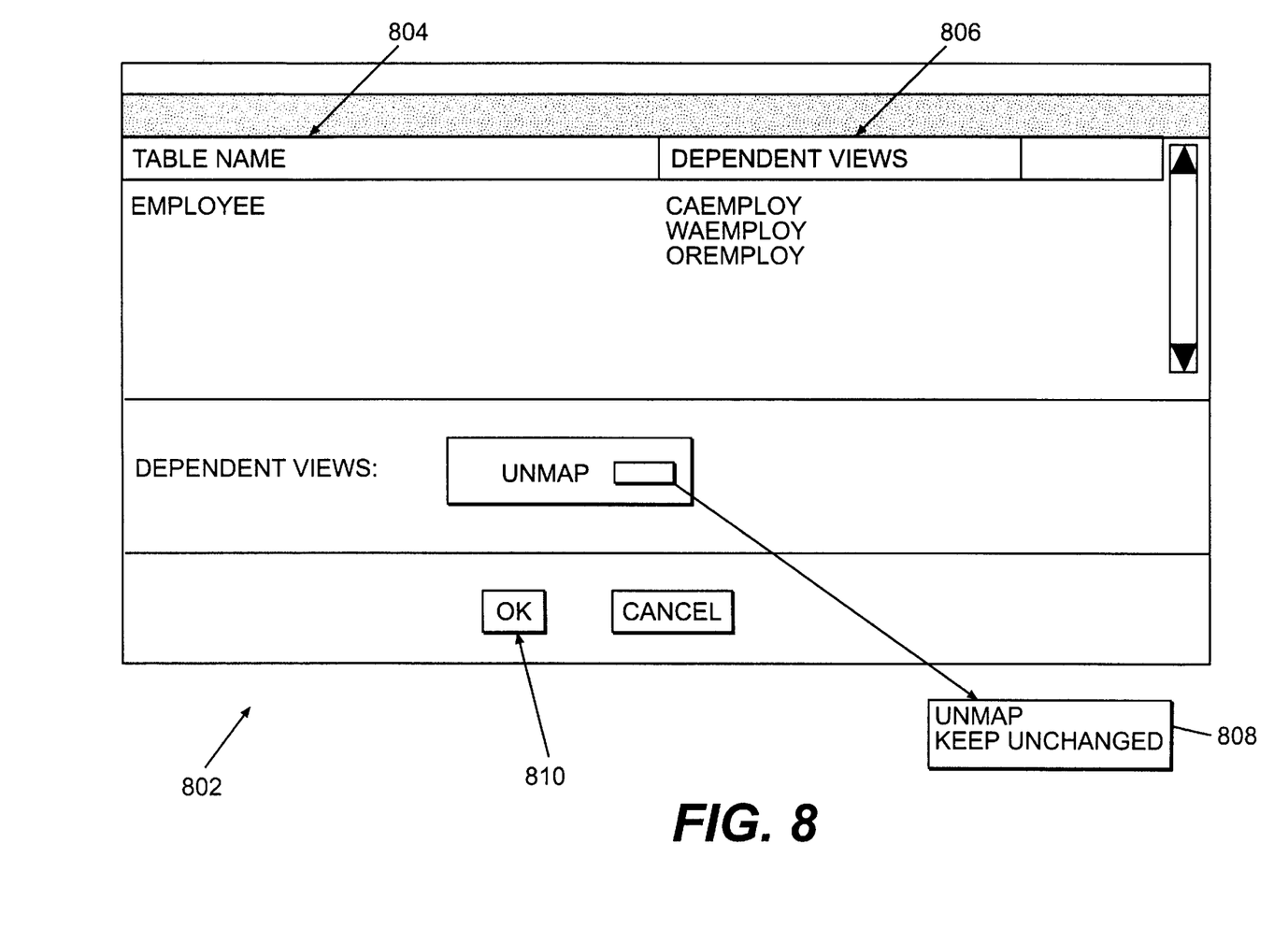
FIG. 8 depicts a display screen produced by the object-relational mapping tool depicted in FIG. 1 in response to a request to map a table that has dependencies that are also mapped.

On the other hand, if in state 328 the programmer was attempting to manually map a table, the object-relational mapping tool, in response to the request, will display a table dependency window (state 332). The table dependency window 802 depicted in FIG. 8 will automatically be displayed by the object-relational mapping tool when the selected table 804 about to be mapped has dependent views that are already mapped 806. The table dependency display window allows the programmer to unmap all the views or keep their status unchanged 808. Once the programmer determines whether or not to unmap or leave unchanged the dependent views, the programmer selects the OK button 810 to initiate the mapping procedure.

Once the programmer manually selects a view or table to be mapped, the object-relational mapping tool generates, as explained above in state 308, an object model reflecting the table or view's data structure to be mapped (state 334). After the object model has been created, the object-relational mapping tool creates, as explained above in state 310, a source code file containing the class represented by the object in the object model (state 336).

After the object-relational mapping tool maps the selected view or table, the programmer determines if any more views or tables require mapping (state 338). If no more tables or views require mapping, processing ends, otherwise the programmer selects a new table or view to be manually mapped (state 328).

Conclusion

The foregoing description of an implementation of the invention has been presented for purposes of illustration and description. It is not exhaustive and does not limit the invention to the precise form disclosed. Modifications and variations are possible in light of the above teachings or may be acquired from practicing the invention. For example, the described implementation includes software but the present invention may be implemented as a combination of hardware and software or in hardware alone. The scope of the invention is defined only by the claims and their equivalents.

What is claimed is:

1. A method in a data processing system containing a database with a logical structure comprising tables and views, wherein the tables and views form a hierarchy, the method comprising:

importing the logical structure of the database;
  displaying the hierarchy to a user;
  receiving an indication of a view, based on user input; and
  generating source code that reflects at least one portion of the logical structure of the database including at least the indicated view.

2. The method of claim 1 wherein the generating includes: generating source code reflecting the tables and the views.

3. The method of claim 1 wherein the generating includes: generating source code reflecting the views.

4. The method of claim 1 wherein the generating includes:
  receiving user input indicating an additional portion of the logical structure; and
  generating source code that reflects the at least one portion and the additional portion.

5. The method of claim 1 wherein the generating includes:
  receiving user input indicating that the at least one portion should not be reflected in the source code; and
  generating source code that does not reflect the at least one portion.

6. A method in a data processing system containing a database with a logical structure comprising tables and views, wherein a plurality of the tables and views do not have dependencies, the method comprising:
  importing the logical structure of the database;
  automatically generating source code reflecting only the plurality of the tables and the views that do not have dependencies.

7. A data processing system containing a database with a logical structure comprising tables and views, comprising:
  means for importing the logical structure of the database;
  means for displaying a hierarchy of the logical structure to a user;
  means for selecting a table or view, responsive to user input;
  means for displaying a definition of a view, responsive to user input; and
  means for editing an updatability status of a view, responsive to user input.

8. A method in a data processing system with a database having a logical structure with views and tables, comprising:
  importing the logical structure of the database;
  creating a data structure representing the logical structure of the database;
  creating from the data structure an object model containing information reflecting at least one portion of the logical structure including information reflecting at least one view;

creating from the object model source code reflecting the at least one portion of the logical structure;

displaying the imported logical structure to a user;

receiving modifications to the at least one portion from the user;

updating the object model to reflect the modifications; and generating from the updated object model new source code to reflect the modifications.

9. The method of claim 8, wherein the at least one portion has a customizable updatability, and wherein the receiving modifications includes:

receiving a request to change the updatability status of the at least one portion of the logical structure, and wherein the updating the object model includes:

checking the relational model for consistency of changed updatability; and updating the object model to reflect the change in the updatability status.

10. The method of claim 8 wherein the receiving modifications includes:

receiving an indication of an additional portion of the logical structure, wherein the updating the object model includes:

creating a portion of the object model to reflect the additional portion, and wherein the generating includes:

generating the new source code to reflect the additional portion.

11. The method of claim 8 wherein the receiving modifications includes:

receiving an indication to not generate source code for the at least one portion, wherein the updating the object model includes:

creating the object model such that it does not reflect the at least one portion, and wherein the generating includes:

generating the new source code to such that it does not reflect the at least one portion.

12. A data processing system comprising:

a secondary storage device containing a database with a logical structure of tables and views, wherein the tables and views have an associated updatability status;

a memory containing an object-relational mapping tool configured to import at least one portion of the logical structure including at least one view and configured to generate source code reflecting the at least one portion of the logical structure; and a processor configured to run the object-relational mapping tool, wherein the object-relational mapping tool further includes:

a display component for displaying the updatability status to a user; and an updatability modification component configured to modify the updatability status of the at least one portion of the logical structure, responsive to user input.

13. The data processing system of claim 12 wherein the object-relational mapping tool contains a manual mapping component configured to operate after the source code has been generated and configured to update the source code to reflect an additional portion of the logical structure responsive to user input.

14. The data processing system of claim 12 wherein the object-relational mapping tool contains a manual mapping component configured to operate after the source code has been generated and configured to update the source code so that it does not reflect the at least one portion of the logical structure responsive to user input.

15. A data processing system with a database having a logical structure with views and tables, comprising:

means for importing the logical structure of the database;

means for creating a data structure representing the logical structure of the database;

means for creating from the data structure an object model containing information reflecting at least one portion of the logical structure including information reflecting at least one view;

means for creating from the object model source code reflecting the at least one portion of the logical structure;

means for displaying the imported logical structure to a user;

means for receiving modifications to the at least one portion from the user;

means for updating the object model to reflect the modifications; and means for generating from the updated object model new source code to reflect the modifications.

16. A computer-readable medium containing instructions for controlling a data processing system to perform a method, the data processing system containing a database with a logical structure comprising tables and views, wherein a plurality of the tables and views do not have dependencies, the method comprising:

importing the logical structure of the database;

automatically generating source code only reflecting the plurality of the tables and the views that do not have dependencies.

17. A method in a data processing system containing a database with a logical structure comprising tables and views, comprising:

importing the logical structure of the database;

displaying a hierarchy of the logical structure to a user;

selecting a table or view, responsive to user input;

displaying a definition of a view, responsive to user input; and editing an updatability status of a view, responsive to user input.

18. A computer-readable medium containing instructions for controlling a data processing system to perform a method, the data processing system containing a database with a logical structure comprising tables and views, wherein the tables and views form a hierarchy, the method comprising:

importing the logical structure of the database;

displaying the hierarchy to a user;

receiving an indication of a view, based on user input; and generating source code that reflects at least one portion of the logical structure of the database including at least the indicated view.

19. The computer-readable medium of claim 18 wherein the generating includes:

generating source code reflecting the tables and the views.

20. The computer-readable medium of claim 18 wherein the generating includes:

generating source code reflecting the views.

21. The computer-readable medium of claim 18 wherein the generating includes:

receiving user input indicating an additional portion of the logical structure; and generating source code that reflects the at least one portion and the additional portion.

22. The computer-readable medium of claim 18 wherein the generating includes:

receiving user input indicating that the at least one portion should not be reflected in the source code; and generating source code that does not reflect the at least one portion.

23. A method in a data processing system containing a database with a logical structure comprising tables and views, the method comprising:

importing the logical structure of the database;

displaying the logical structure to a user;

selecting a table or view, responsive to user input;

displaying mapping fields for each table and view to a user, wherein the mapping fields indicate a mapping status of each corresponding table and view of the logical structure;

editing the mapping field for the selected table or view, responsive to user input; and displaying the edited mapping field to the user.

24. The method of claim 23, wherein the step of displaying mapping fields further includes:

displaying the hierarchy of the selected table or view.

25. A data processing system containing a database with a logical structure comprising tables and views, comprising:

means for importing the logical structure of the database;

means for displaying the logical structure to a user;

means for selecting a table or view, responsive to user input;

means for displaying mapping fields for each table and view to a user; wherein the mapping fields indicate a mapping status of each corresponding table and view of the logical structure;

means for editing the mapping field for the selected table or view, responsive to user input; and means for displaying the edited mapping field to the user.

26. The data processing system of claim 25, wherein the means for displaying mapping fields further includes means for displaying the hierarchy of the selected table or view.

* * * * *

UNITED STATES PATENT AND TRADEMARK OFFICE
CERTIFICATE OF CORRECTION

PATENT NO. : 6,175,837 B1
DATED : January 16, 2001
INVENTOR(S) : Rahul Sharma and Linda G. DeMichiel It is certified that error appears in the above-identified patent and that said Letters Patent is hereby corrected as shown below:

ON THE TITLE PAGE

Item [54] Title line 1 change "TOLL" to --TOOL--.

Signed and Sealed this

Fifteenth Day of May, 2001

*Attest:*

NICHOLAS P. GODICI

*Attesting Officer*   *Acting Director of the United States Patent and Trademark Office*